June 7, 1932.                J. J. McCABE                1,862,194
                        GLASS CRUMBLING MACHINE
                          Filed Nov. 1, 1928            2 Sheets-Sheet 1
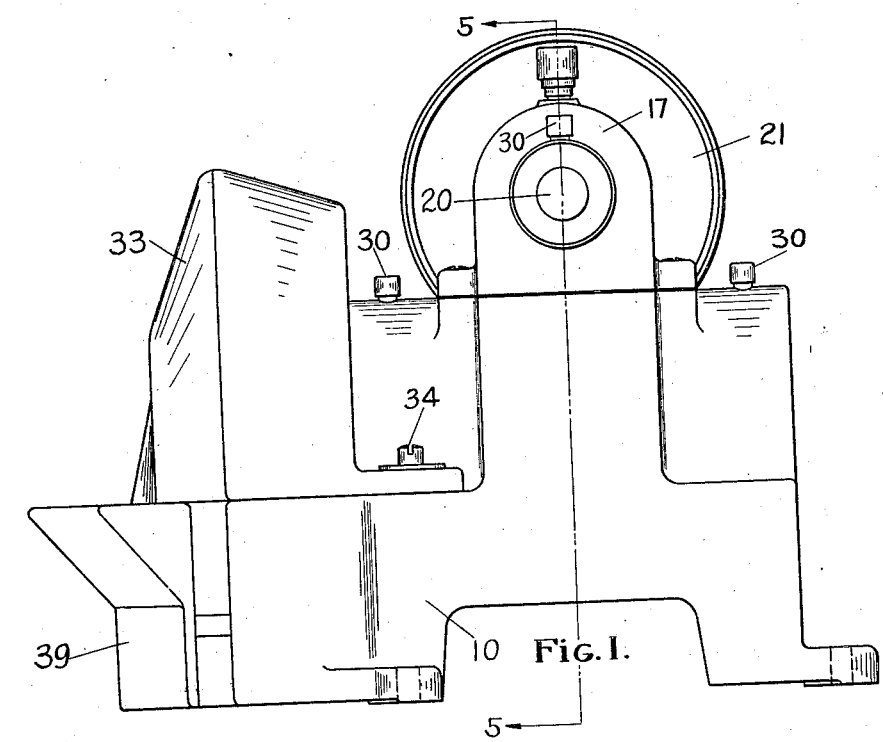
Fig. 1.
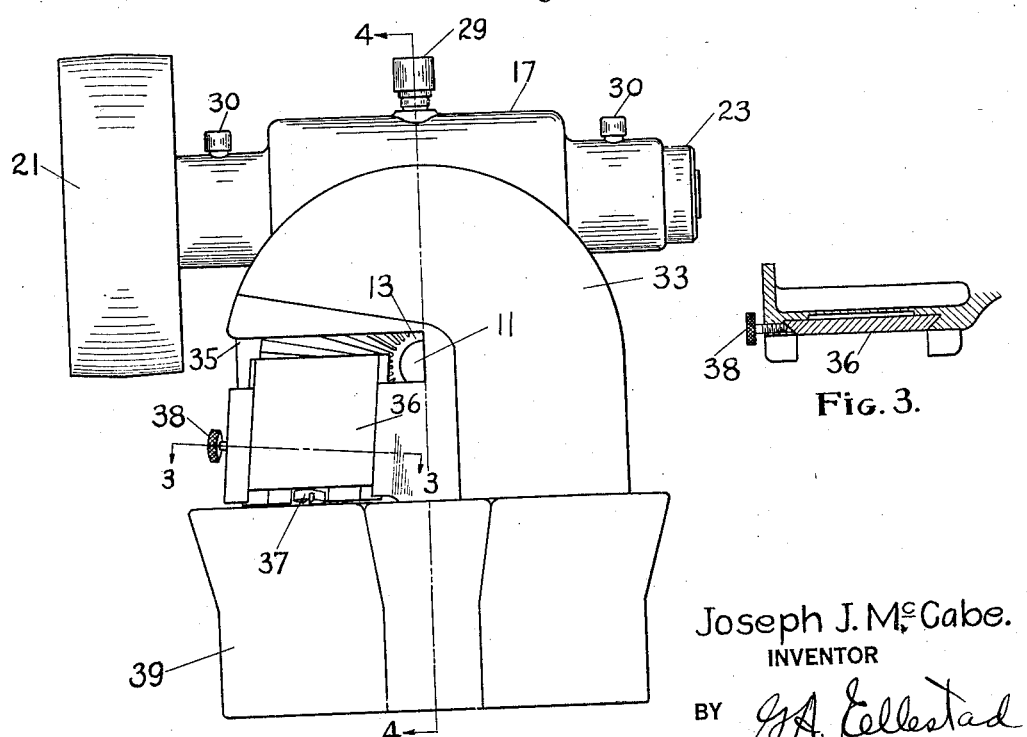
Fig. 2.
Fig. 3.
Joseph J. McCabe.
INVENTOR
BY  G. A. Ellestad
        ATTORNEY June 7, 1932.  J. J. McCABE  1,862,194
GLASS CRUMBLING MACHINE
Filed Nov.1, 1928  2 Sheets-Sheet 2
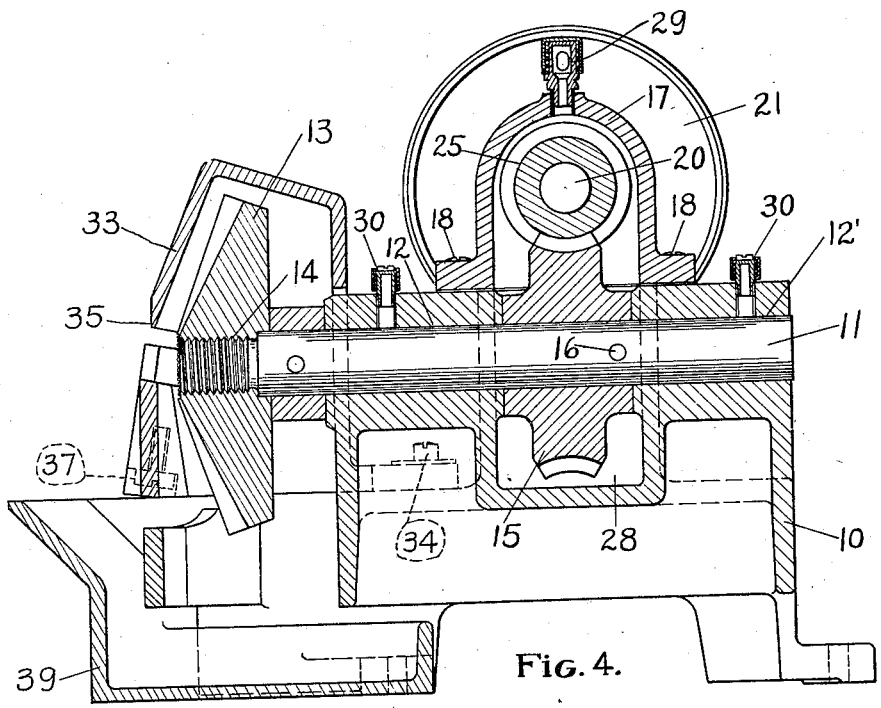
Fig. 4.
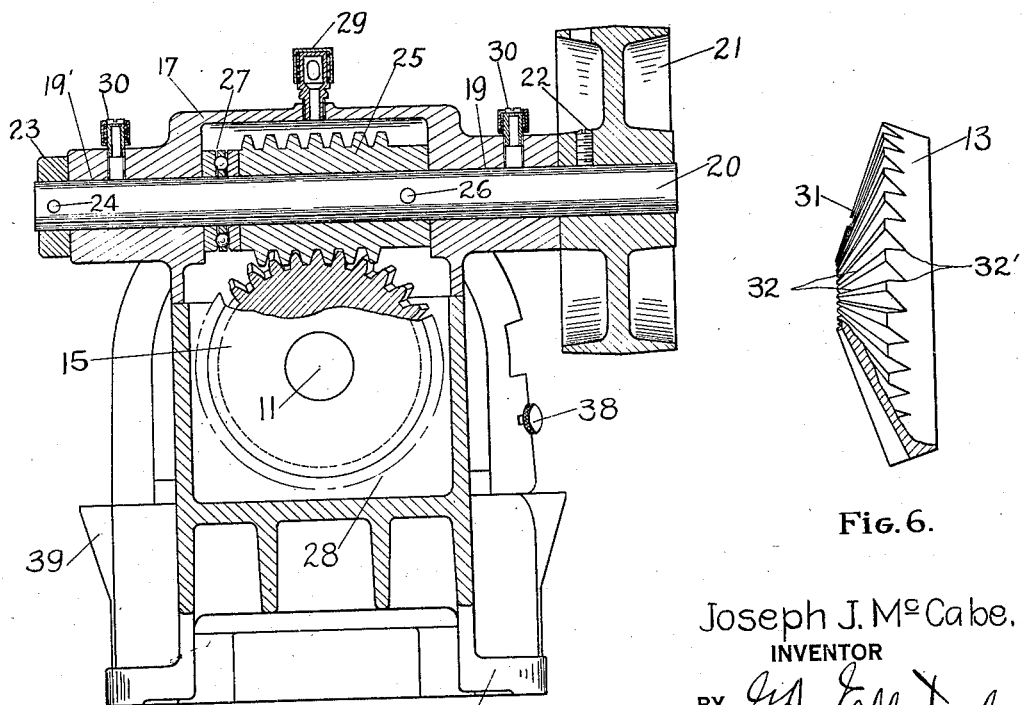
Fig. 5.
Fig. 6.
Joseph J. McCabe,
INVENTOR
BY J.A. Ellestad
ATTORNEY Patented June 7, 1932

1,862,194

UNITED STATES PATENT OFFICE

JOSEPH J. McCABE, OF ROCHESTER, NEW YORK, ASSIGNOR TO BAUSCH & LOMB OPTICAL COMPANY, OF ROCHESTER, NEW YORK, A CORPORATION OF NEW YORK

GLASS CRUMBLING MACHINE

Application filed November 1, 1928. Serial No. 316,577.

This invention relates to glass working machinery and more particularly it has reference to a machine for crumbling or breaking away the edge of a piece of glass which is relatively flat, such as an ophthalmic lens blank, for example. This method of removing undesired portions from the edge of a piece of glass by breaking away or crumbling the edge, is well known in the art and is quite generally carried out by means of a pair of pliers having relatively broad, flat jaws. Pliers of this type are held in the hand of the operator and by skillful manipulation are used to break or crumble away relatively small portions from the edge of a piece of glass. In this manner, a piece of glass may be reduced to an approximate desired area or size more rapidly than by the slower method of grinding.

One of the objects of the present invention is to provide power operated means for breaking away or crumbling the edge of a piece of glass. Another object is to provide a crumbling tool which is adapted for crumbling or breaking away the edge of a piece of glass; and still another object is to provide such a tool which will be adapted for operation upon pieces of glass of various thicknesses. Other objects and advantages reside in certain novel features of construction, arrangement and combination of parts, which will hereinafter be more fully described and pointed out in the appended claims.

Referring to the drawings:

Fig. 1 shows a side elevation of my machine.

Fig. 2 shows a front elevation.

Fig. 3 is a sectional view taken on line 3—3.

Fig. 4 shows a vertical sectional view taken on line 4—4 of Fig. 2.

Fig. 5 shows a vertical sectional view taken on line 5—5 of Fig. 1.

Fig. 6 shows an elevation of the crumbling tool with parts in section.

Similar reference characters indicate the same parts throughout the drawings.

A preferred embodiment of my device is shown in the drawings, wherein 10 indicates the base member which comprises an integral casting. A shaft 11 is mounted to rotate in the bearings 12 and 12' which are formed integral with base member 10. The crumbling tool 13, which will hereinafter be more fully described, is rigidly secured to one end of shaft 11 by means of the screw threads 14. A worm wheel 15 is fixedly secured to shaft 11 by means of a pin 16.

A cast housing member 17, which is secured to the base member 10 by screws 18, provides bearings 19 and 19' for the shaft 20. A pulley 21 is secured by a set screw 22 to one end of the shaft 20 and a collar 23 is secured to the other end of shaft 20 by a pin 24. A worm 25 is fixed to shaft 20 by pin 26 and a thrust bearing 27 is provided adjacent the worm 25. It will be apparent that when power is applied to pulley 21 the power will be transmitted by means of the worm and wheel to cause a rotation of the crumbling tool 13. Formed integral with the base 10 is a recess or reservoir 28 which may be filled with oil through the oil cup 29, thereby affording proper lubrication of the worm wheel. Suitable oil cups 30 are provided for the purpose of lubricating shafts 11 and 20.

As shown in Figs. 4 and 6, the crumbling tool 13 presents a substantially frusto-conical shape. The cutting or crumbling face 31 of the tool 13 comprises a plurality of spaced, radially disposed teeth 32 which are formed by the spaced grooves 32'. The cutting face of each tooth lies in a plane which passes through the axis of rotation of the tool 13. The cutting face of each tooth has its greatest area out at the periphery of the tool and the area gradually decreases from the periphery to the center as the grooves 32' are deepest out at the periphery. The tool 13 is preferably made of soft steel or other suitable material. A housing 33, secured to the base member 10 by means of screws 34, serves as a guard to enclose the tool 13. The housing 33 is provided with an opening 35 to allow the work to be brought into contact with the face of tool 13. An adjustable work rest 36 is slidably mounted on the housing 33 adjacent to the opening 35. Screw 37 serves to adjust the position of the work rest 36 in order to compensate for wear and screw 38 aids in holding the work rest 36 in position. A removable drawer or pan 39 serves as a receiver for the bits of refuse glass which are crumbled away from the work.

In operation, suitable power applied to pulley 21 causes the crumbling tool 13 to be rotated in a counter-clock-wise direction as viewed in Fig. 2. The work, such as an ophthalmic lens blank, for example, is then held on the top of work rest 36 and is moved forward into contact with the teeth of the rotating crumbling tool 13. Since the teeth 32 vary in depth from the periphery to the center of the tool 13, various thicknesses of glass may be crumbled. Thus, a relatively thin piece of glass can be operated upon most efficiently when it is placed on the work holder adjacent the center of the tool 13 so that the shallow portions of teeth 32 are employed. If a relatively thin piece of glass is held against the teeth out towards the periphery of the tool 13, large pieces of glass would be broken off and the desired crumbling action would not be obtained. Hence to secure efficient operation of the device, it is preferable to begin by placing the work on the work rest adjacent the center of the tool 13 and then gradually move it outwards toward the periphery of the tool until the desired crumbling action is obtained.

From the foregoing, it will be apparent that I am able to attain the objects of the invention and provide a machine for crumbling the edges of a piece of glass and to provide such a machine with a tool adapted for crumbling glass of varying thicknesses. It is obvious that various modifications may be made without departing from the spirit of the invention as pointed out in the appended claims.

I claim:

1. A glass crumbling machine comprising a rotatable crumbling tool having teeth radially disposed with respect to the axis of rotation of said tool, the operating faces of said teeth varying in area from the center to the periphery of said tool, said faces lying in planes which include the axis of rotation of said tool.

2. A glass crumbling machine comprising a rotatable crumbling tool, means for rotating said tool, said tool having radially disposed teeth, the working faces of said teeth being disposed in planes which pass through the axis of rotation of said tool, said faces varying in area from the center to the periphery of the tool.

3. A glass crumbling machine comprising a rotatable crumbling tool, means for rotating said tool, said tool having radially disposed teeth, the operating faces of said teeth being relatively broad flat surfaces which increase in area from the center to the periphery of said tool, and a work rest disposed laterally of and substantially in line with the axis of rotation of said tool whereby work placed on said rest may be subjected to the downward impact of said teeth to effect a crumbling action.

4. A glass crumbling machine comprising a rotatable crumbling tool having teeth which are radially disposed with respect to the axis of rotation of said tool, the operating faces of said teeth being flat surfaces which lie in the plane of the axis of rotation, said surfaces having areas which gradually vary in size from the periphery to the center of the tool, and a work rest disposed laterally of and substantially in line with the axis of rotation of said tool whereby work may be placed on said rest and selectively subjected to the downward impact of the surface of said teeth to effect crumbling actions of varied degrees.

JOSEPH J. McCABE.